May 3, 1938. C. W. SPICER 2,116,290
SEALED PROPELLER SHAFT
Filed Sept. 10, 1936 2 Sheets-Sheet 2
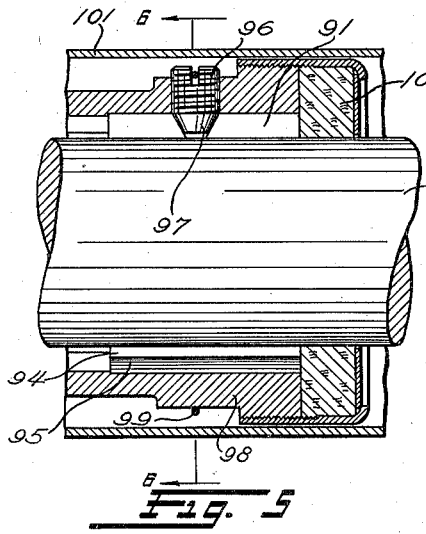
Fig. 5
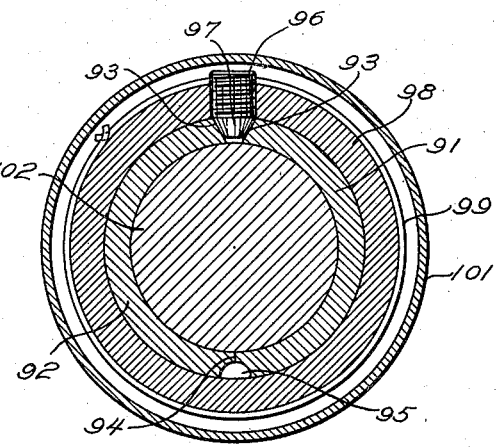
Fig. 6
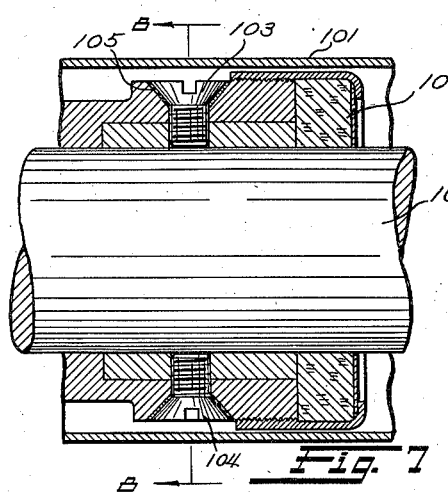
Fig. 7
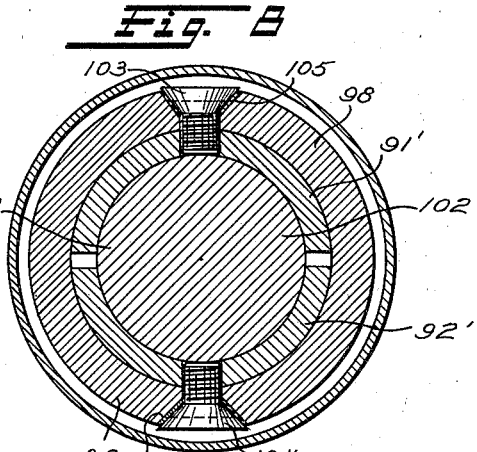
Fig. 8
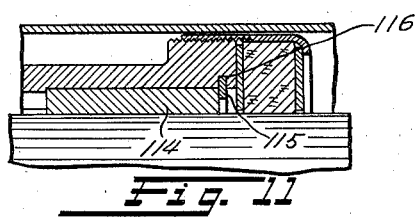
Fig. 9
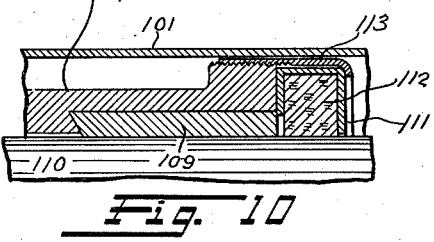
Fig. 10
Fig. 11
Inventor
Clarence W. Spicer
By Strauch & Hoffman
Attorney Patented May 3, 1938

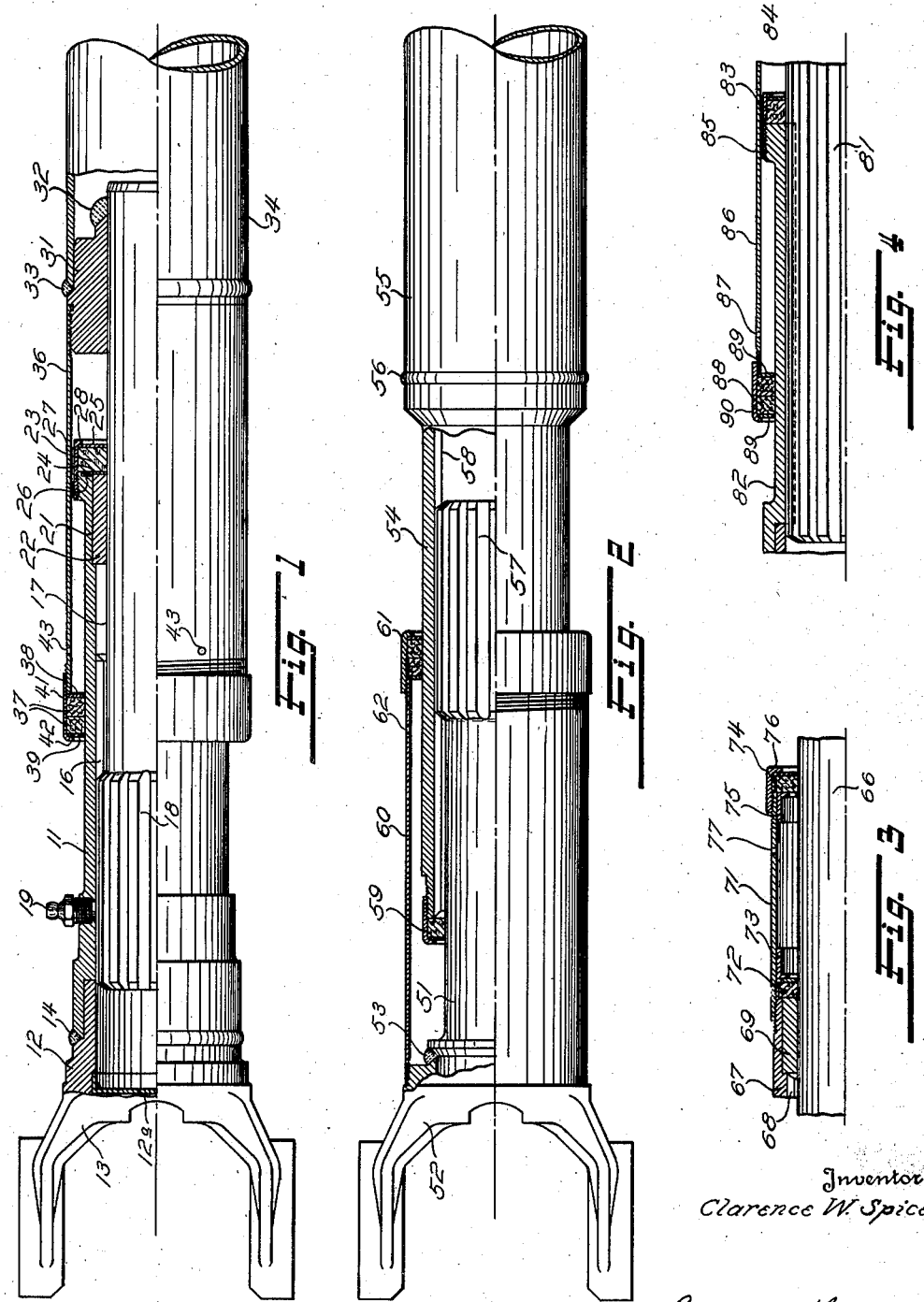

2,116,290

UNITED STATES PATENT OFFICE 2,116,290

SEALED PROPELLER SHAFT

Clarence W. Spicer, Toledo, Ohio, assignor to Spicer Manufacturing Corporation, Toledo, Ohio, a corporation of Virginia Application September 10, 1936, Serial No. 100,190

15 Claims. (Cl. 64—23)

The present invention relates to rotary shafting capable of longitudinal extension, and more particularly concerns a sealed slip joint of the type employed in propeller shafts.

It has been found in the practical application of slip joints of the type used on propeller shafts that under severe conditions of wear a certain amount of "play" or lost motion tends to develop between the mating parts of the slip joint. This results in looseness between the mating parts during operation, and it has been found as a consequence that a certain amount of radial or transverse flexing of the shaft elements occurs at the slip joint, thus introducing unevenness and vibration in the transmission of the power.

In commercial use of propeller shafts incorporating a slip joint it is accordingly important that an accurate axial alignment of the rotary shaft elements be preserved at all times, and especially during high speed rotation of the propeller shaft. The present invention overcomes the transverse flexing above described and insures axial alignment of the shaft elements at all times by providing a construction which materially increases the axial length of contact between the mating parts and therefore eliminates any undesirable effects caused by wear of the mating parts.

It has further been found in commercial propeller shaft slip joints that foreign matter such as grit tends to work past the lubricant seal and into the interior of the slip joint. This difficulty has been encountered particularly in the use of slip joints on the propeller drives of railway rolling stock where sand and grit from the gravel ballast tends to stick to the lubricant on the rotary shafting and work past the lubricant seal into the interior of the joint. The present invention overcomes this defect in prior devices by providing a combined seal and shield assembly for inclosing the lubricant seal and for preventing foreign matter from gaining access to the region of the lubricant seal, thus precluding any possibility of such foreign matter working into the interior of the slip joint.

A primary object of the present invention accordingly resides in the provision of propeller shafting having a slip joint in which the shafting elements are retained in axial alignment at all times.

A further object of the invention resides in the provision of an addition bearing for the shaft sections in addition to that provided by the splined portions to thereby increase the length of bearing surfaces and to relieve the splines of twisting strains.

A still further object of the invention resides in the provision of a pair of concentric telescoped shafts adapted for relative axial displacement and provided with mating splines for locking said shafts rotatively together and for retaining the shafts in concentric relation adjacent the splines, in combination with a bearing spaced from the splines and designed to retain the shafts in concentric relation adjacent the bearing, the splines and bearing thus serving to retain the shafts in axial alignment.

A still further object of the invention resides in the provision of propeller shafting wherein means are provided for retaining the shaft elements in alignment at all times, and further means are provided for sealing the elements against escape of lubricant from, and ingress of foreign matter into, the shafting.

A still further object of the invention resides in the provision of shafting including a slip joint wherein double sealing means are provided for sealing the joint against escape of lubricant from the interior thereof and for preventing ingress of foreign matter into the interior of the joint.

A still further object of the invention resides in the provision of a pair of telescoping shafts provided with a fluid seal for preventing escape of lubricant from the interior of the coupling in combination with means for shielding the lubricant seal against foreign matter from the exterior of the coupling.

Further objects of the invention will appear as a description thereof proceeds with reference to the accompanying drawings, in which:

Figure 1 is a view partly in elevation and partly in section illustrating a preferred form of the present invention as embodied in a universal slip joint assembly;

Figure 2 is a view similar to Figure 1 illustrating a modified form of the invention shown in Figure 1, and wherein the aligned rotary elements have been reversed from end to end;

Figure 3 is a fragmental view in longitudinal section illustrating an alternate arrangement of the double seal assembly forming a part of the present invention;

Figure 4 is a fragmental view in longitudinal section illustrating an alternate arrangement for preserving alignment between the rotary shaft elements of the slip joint;

Figure 5 is a fragmental view in longitudinal section illustrating a modified construction for retaining the alignment bushing within the rotary sleeve element;

Figure 6 is a sectional view taken along line 6—6 of Figure 5;

Figure 7 is a fragmental view in longitudinal section illustrating a still further modified construction for retaining the alignment bushing within the rotary sleeve element;

Figure 8 is a sectional view taken along line 8—8 of Figure 7;

Figure 9 is a fragmental sectional view illustrating a modified arrangement for retaining the alignment bushing within the rotary sleeve, and further illustrating a modified lubricant seal and retainer assembly;

Figure 10 is a fragmental sectional view illustrating a modified form of alignment bushing, and also illustrating a further modified lubricant seal and retainer assembly;

Figure 11 is a fragmental view illustrating a still further modified construction for retaining the alignment bushing within the rotary sleeve, and illustrating a further modified lubricant seal and retainer assembly.

With reference to Figure 1 of the drawings the present invention includes a sleeve member 11, on one end of which is mounted a sleeve 12 of a universal joint yoke 13. Yoke 13 may be secured with respect to sleeve 11 in any suitable manner as for example by means of welding 14 or the like. The end of the bore in yoke sleeve 12 remote from sleeve 11 is preferably closed by a cap 12a to prevent the escape of lubricant from the interior of the sleeve.

The end of sleeve member 11 adjacent sleeve 12 is provided with internal splines 16. Telescoped within sleeve 11 is one end of a shaft 17 provided with external splines 18 adapted for sliding engagement with internal splines 16. Sleeve 11 is provided with a grease fitting 19 by means of which lubricant may be introduced into the interior of the sleeve for lubricating the splines.

Mounted within an enlarged bore 21 formed in the end of sleeve 11, remote from yoke 13, is an annular guide bushing 22 which is formed to provide a close fit about the neck of shaft 17. Bushing 22 thus serves to slidably support shaft 17 relative to sleeve 11 in a location remote from the support offered by internal splines 15 and 16.

From the structure so far described it will be apparent that sleeve 11 and shaft 17 are locked for rotation together by means of the internal splines on the sleeve and the external splines on the shaft. While at the same time the sleeve and shaft are adapted for telescoping movement relative to each other. It will be further apparent that the sleeve and shaft are retained in axial alignment at all times by virtue of the fact that the mating splines preserve the sleeve and shaft in concentric relation in the region of the splines, and bushing 22 retains the sleeve and shaft in concentric relation in the region of the bushing. Furthermore, the axial length and total area of sliding contact between the sleeve and shaft, which is provided by the mating splines and bushing 22, is sufficient to insure that the slight wearing of the splines and bushing in actual use will not be sufficient to cause play or lost motion between the sleeve and shaft as will result in slight transverse flexing thereof, but on the contrary, the sleeve and shaft will at all times be constrained to rotate in axial alignment.

It is therefore apparent that the structure thus far described provides a coupling for rotary shafting which is flexible in an axial direction, and which insures axial alignment of the rotary elements at all times.

The end of sleeve 11 remote from yoke 13 is provided with a lubricant seal in the form of an annular ring 23 disposed between a pair of washers 24 and 25, which are preferably formed of metal or other suitable material. Ring 23 is preferably formed from cork which has been found in practice to give satisfactory service as a seal against fluids such as lubricant. The cork ring is formed to extend into a sliding friction fit with the neck of shaft 17 for exerting a wiping action thereon during telescoping action of shaft 17 and sleeve 11. Washer 24 preferably abuts directly against the rear face of guide bushing 22 and is received within an annular bore 26 formed in the rear end of sleeve 11. The lubricant seal is retained in assembled position by means of a retainer cap 27, which is provided with an axially directed portion adapted to be threaded on the rear end of sleeve 11 and to encircle cork seal 23, and is further provided with a radially directed flange portion 28 adapted to clamp against washer 25. Retainer cap 28, upon being turned tightly on the end of sleeve 11, will securely clamp the lubricant seal against the rear end of the sleeve and guide bearing to prevent escape of lubricant axially along the neck of shaft 17 from the interior of sleeve 11.

A cylindrical head member 31 is mounted adjacent the end of shaft 17 which projects beyond sleeve 11, and such mounting may be effected in any suitable manner as for example by pressing the head over the end of the shaft and securing the latter thereto by means of welding 32 or the like so that head 31 is rigidly secured to the shaft. Mounted upon the rear end of the exterior surface of head 31 as by welding 33 or the like is a tubular propeller shaft 34. It will be seen that shaft 17, head 31, and tubular propeller shaft 34 comprise an integral rotary unit, the shaft, head, and propeller shaft being formed as separate members to facilitate assembly thereof relative to the other elements of the slip joint construction.

Threaded on the forward end of annular head 31 is a cylindrical shield member 36, which is concentric with shaft 17, and which is axially directed forward from head 31 to enclose lubricant seal 23. The forward extremity of shield 36 is provided with a dirt sealing assembly comprising a pair of annular rings 37 disposed between a pair of washers 38 and 39 formed of metal or other suitable material. Rings 37 are preferably formed of dry felt which in use has been found to serve as a satisfactory seal against dirt, grit, sand, gravel and other foreign substances. Rings 37 are formed to extend into sliding friction fit with the exterior surface of sleeve 11 for exerting a wiping action on the sleeve during telescoping of sleeve 11 and shaft 17. The seal assembly is maintained in position against the end of shield 36 by means of an axially directed retainer cap 41, which is threaded on the forward end of shield 36 and which is provided with a radially extending flange 42 for clamping against the seal assembly. Disposed circumferentially about shield 36 near the forward end thereof are a series of apertures 43 which serve a purpose presently to be described.

As previously described cork lubricant seal 23 is for the purpose of preventing escape of lubricant from the interior of sleeve 11. It has been found in practice, however, that during telescoping action between sleeve 11 and shaft 17, lubricant disposed on the neck of shaft 17 may be carried past bushing 22 and beyond sleeve 11 as shaft 17 telescopes outwardly therefrom. It has further been found that any foreign matter disposed in this region will tend to cling to the neck of sleeve 11 and be carried thereby past the lubricant seal and into the interior of sleeve 11 during telescoping action between sleeve 11 and shaft 17. The introduction of such foreign substances into the interior of sleeve 11 causes excessive wear of the guide bushing and mating splines with the result that the useful life of the slip joint is materially reduced and the proper operation of the device is hindered. This action has created undesirable results particularly under conditions where the slip joint is used in connection with the propeller drive on railway vehicles. It has been found that sand and grit from the gravel ballast tends to adhere to the neck of the rotary shaft and to work into the interior of the rotary sleeve.

In order to overcome such undesirable results the present invention is provided with the shield and dirt seal assembly above described which enclose the lubricant seal of the slip joint. By this construction the ingress of foreign matter such as grit and gravel into the region of the lubricant seal is prevented.

Apertures 43 in the dirt shield 36 are provided in order that any lubricant escaping from the interior of sleeve 11 past the lubricant seal and working along shield 36 may be flung outwardly therefrom through the apertures under the influence of centrifugal force. It will be apparent that any escaped oil therefore serves to wash out through apertures 43 foreign substances which may have worked past the dirt seal. Under the combined brushing or broom action of the felt seal 37 and the washing action of any escaped oil which is flung outwardly through apertures 43, a completely effective seal against introduction of foreign substances into the interior of the slip joint is provided.

In Figure 2 is shown a modified form of the invention wherein the rotary elements are reversed from left to right with respect to the form of the invention shown in Figure 1, the rotary sleeve being carried by the propeller shaft, and the solid shaft being mounted on the universal yoke member. Figure 2 further differs from Figure 1 by the omission of alignment bushings 22. Referring now in detail to Figure 2, on one end of a shaft 51 is mounted a universal joint yoke member 52, the parts being secured together in any suitable manner, as for example by means of welding 53 or the like. The end of shaft 51 remote from yoke 52 is telescoped within a sleeve element 54 which is secured to tubular propeller shaft 55, as by means of welding at 56 or the like. The shaft 51 telescoped within sleeve 54 is provided with the usual external splines 57 which are adapted to cooperate with internal splines 58 formed within the sleeve 54. The forward end of sleeve 54 is provided with a lubricant seal indicated generally at 59 which is adapted to extend into wiping contact with the neck of shaft 51 to prevent the escape of lubricant from the interior of sleeve 54. Mounted on yoke member 52 and enclosing the lubricant seal 59 is a shield 60, the rear end of which is provided with a seal 61 extending into wiping contact with the exterior surface of sleeve 54 for the purpose of preventing dirt and foreign material from entering the interior of the seal in the region of lubricant seal 59. Openings 62 which are provided in shield 60 function similar to openings 43 in Figure 1. The individual elements of the construction just described are counter-parts of similar elements described in connection with Figure 1, with the exception that the parts are assembled together in a different relation with respect to each other as previously pointed out. The operation of the form of the invention shown in Figure 2 is identical with the operation of the form of the invention shown in Figure 1.

In Figure 3 is shown a modified form of sealing element wherein both of the seals are mounted upon the same rotary element instead of having one of the seals mounted on each rotary element as shown in Figures 1 and 2. In the form of invention shown in Figure 3 a solid shaft 66 is telescoped within a sleeve 67 provided with internal splines 68 which extend substantially to the rear of the sleeve. An alignment bearing 69 is mounted within the rear end of sleeve 67 and extends into close engagement with the shaft 66. Threaded on the rear end of sleeve 67 is a cylindrical member 71 disposed concentrically with respect to shaft 66 and spaced therefrom. Disposed against the rear end of sleeve 67 and alignment bushing 69 is a lubricant seal 72, formed of cork or other suitable material, and retained in place by means of a ring 73 press-fitted within cylindrical member 71.

Disposed at the rear end of cylindrical member 71 is a dirt seal 74, formed of felt or other suitable material, secured in place between ring member 75, press fitted within the end of the cylindrical member 71, and a cup shaped retainer member 76 threaded on the end of cylindrical member 71. Dirt seal 74 is designed to extend into wiping contact with the shaft 66, to prevent the entrance of dirt, grit and other foreign substances into interior of cylindrical member 71 in the region of lubricant seal 72.

It will be observed in this form of the invention that both the lubricant seal 72 and the dirt seal 74 are secured with respect to rotary sleeve elements 67, neither of the sealing elements being mounted with respect to rotary shaft element 66. This form of the invention is also provided with apertures 77 for discharging escaped lubricant.

In the form of the invention illustrated in Figure 4 the shaft 81 is provided with long splines which fit within the sleeve 82 having matching splines, the length of the splines in this form of the invention being relied on to preserve alignment. A lubricant seal, comprising a cork or like gasket 83 held in place by a washer 84 and retainer cap 85 prevents substantial escape of lubricant. Whatever lubricant escapes passes in the sleeve 86 of the dirt shield, and if it flows toward the dirt seal is discharged through openings 87 in the manner already described. The dirt seal, which is thus kept dry, comprises, preferably, a pair of felt gaskets 88, disposed between metal washers 89, the gaskets and washers being secured on the end of the sleeve 86 by a cap 90.

In Figures 5 and 6, a preferred way of securing such a bearing bushing, as that shown at 69 in Figure 3, in place, is shown. The bushing may be made in halves 91 and 92 having the adjacent ends 93 beveled, as indicated in Figure 6. The other adjacent ends 94 abut against each other as shown, except where cut away at 95. Said ends are cut away at 95 to permit expansion of the bushing by means of a screw 96 having a wedge-shaped end 97, disposed between the beveled ends 93. The screw 96 is threaded in the sleeve or hollow shaft 98, and prevented from inadvertent turning by a wire 99 encircling said sleeve or shaft. A lubricant seal 100 of the type already described seals the end of the sleeve or shaft 98, and said seal is housed with the sleeve 101 of a dust or dirt shield of the kind already described.

It will be understood that the screw 96 is adjusted to expand the bushing halves 91 and 92 into contact with the inner wall of the sleeve or hollow shaft 98 to minimize friction between the bushing and the solid shaft 102 which it maintains in substantial alignment in the manner already described.

In Figures 7 and 8 a slight modification of the arrangement of Figures 5 and 6 is shown. In this form of the invention the bushing or bearing comprised two halves 91' and 92'. The adjacent ends of said halves are located at the sides of the shaft 102, viewing Figure 8 and are preferably spaced apart as shown. The halves are secured to sleeve or hollow shaft 98 by means of screws 103 and 104 held from inadvertent turning by lock washers 105. In other respects, the modification of Figures 7 and 8 is like Figures 5 and 6.

In the modification illustrated in Figure 9, a split bearing bushing 106 is maintained in contact with the hollow shaft or sleeve 98 by a split spring ring 107. The lubricant seal in this form of the invention includes a cork or like gasket disposed in an encircling spring ring 108. In other respects the construction of Figure 9 is like that already described.

In Figure 10 a split bearing bushing 109, having a beveled end 110 seated in a matching recess in the sleeve or hollow shaft 98, is retained by contact with a metal shell 111 containing a cork or like packing 112. A cap 113 retains the shell, packing and bushing in position. The engagement of the beveled end of the bushing with the wall of the recess in the sleeve 98 serves to wedge the sections of the bushing against the inside of said sleeve.

In Fig. 11, a split or one-piece bearing bushing 114 is secured in the hollow shaft or sleeve by a split spring ring 115 snapped into a groove 116 cut in the sleeve adjacent the end thereof. In other respects this form of the invention is like that already described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination, a shaft, a sleeve concentrically disposed about said shaft in spaced relation thereto, means for keying said shaft and sleeve for rotation together and for retaining said shaft and sleeve in concentric relation, and bearing means spaced from said first named means for retaining said shaft and sleeve in concentric relation.

2. In combination, a shaft, a sleeve concentrically disposed about said shaft in spaced relation thereto, external splines formed on said shaft, internal splines formed on said sleeve for mating with said shaft splines, a bearing disposed between said shaft and sleeve at a substantial distance from said splines, said bearing and splines serving to retain said shaft and sleeve in axial alignment.

3. In combination, a pair of telescoping shafts, mating splines on said shafts for causing said shafts to rotate together, an annular bearing mounted on one of said shafts and extending into contact with said other shaft, said bearing being substantially spaced from said splines, and means for causing said bearing to bear firmly against one of said shafts whereby friction between said bearing and the other shaft is minimized.

4. In propeller shafting, a sleeve secured to a universal joint yoke, a propeller shaft telescoped within said sleeve projecting from the end thereof remote from said yoke, internal splines formed on said sleeve adjacent said first named end, external splines formed on said shaft adjacent the end disposed within said sleeve and mating with said sleeve splines, an annular bearing mounted within said sleeve adjacent said second named end and extending into circumferential contact with said shaft, said splines and said bearing being disposed in spaced relation and serving to retain said sleeve and shaft in alignment.

5. In propeller shafting, a sleeve, a shaft telescoped at one end within said sleeve, mating splines formed on said sleeve and shaft, a bearing disposed between said sleeve and shaft and axially spaced from said splines, said splines and bearing serving to retain said sleeve and shaft in axial alignment, sealing means mounted on one end of said sleeve and extending into circumferential contact with the neck of said shaft projecting outwardly from said sleeve for preventing escape of fluid from the interior of said sleeve, and further sealing means including the neck of said shaft and extending into circumferential contact with the exterior of said sleeve to inclose said first named sealing means and prevent ingress of foreign matter into the region of said first named sealing means.

6. In propeller shafting, a pair of telescoping shafts, and bearing means for locking said shafts for rotation together and for retaining said shafts in axial alignment comprising mating splines formed on said shafts, and an additional bearing between said shafts and spaced from said splines to retain said shafts in axial alignment.

7. In propeller shafting, a sleeve, a shaft telescoped within said sleeve and having a portion projecting outwardly beyond the end of said sleeve, sealing means between said sleeve and shaft adjacent said sleeve end for preventing escape of fluid from the interior of said sleeve, and additional sealing means between said sleeve and shaft bodily inclosing said first named sealing means and bearing upon the outer surface of said sleeve for preventing access of dust or dirt to said first-named sealing means.

8. Propeller shafting including a shaft and a sleeve slidably splined together, a lubricant seal between an end of said sleeve and said shaft, and a dust and dirt shield encasing said end and said seal, said shield including a gasket and means to prevent any lubricant that passes said seal from reaching said last-named gasket.

9. Propeller shafting including a shaft and a sleeve slidably splined together, a lubricant seal between an end of said sleeve and said shaft, a bearing bushing between an end of said sleeve and said shaft, a gasket bearing against said bushing and said end of the shaft and surrounding said shaft, means to secure said gasket to said sleeve, and mechanism to prevent dust or dirt from gaining access to said gasket and said bushing.

10. The combination defined in claim 9 in which said last named mechanism comprises a housing in the form of a sleeve surrounding said end and said gasket, a further gasket between said housing and first named sleeve and means to discharge any liquid collecting in said housing before it reaches said further gasket whereby the latter is kept dry.

11. Propeller shafting, including a sleeve and a shaft slidably keyed together, a split bearing bushing between said sleeve and shaft, and means to press said bushing into contact with said sleeve.

12. Propeller shafting, including a sleeve and a shaft slidably keyed together, a split bearing bushing between said sleeve and shaft, and a screw having a tapered end disposed between adjacent ends of said bushing to spread said ends and force the bushing into contact with said sleeve.

13. Propeller shafting including a sleeve and a shaft slidably keyed together, a bearing bushing between the end of said sleeve and said shaft, a lubricant seal at said end of said sleeve, and a dirt shield and gasket for said seal including means to discharge lubricant passing said seal before it reaches said gasket.

14. Propeller shafting, including a sleeve and a shaft slidably splined together, a gasket providing a lubricant seal surrounding said shaft and contacting the end of said sleeve, a cap threaded on said sleeve to secure said gasket, and means comprising a further sleeve surrounding said shaft, and the end of said first-named sleeve to which said gasket is secured by said cap, a gasket secured to the end of said second sleeve, and means to prevent lubricant from reaching said last named gasket.

15. Propeller shafting, including a sleeve, a shaft slidably keyed in said sleeve, a cork or like gasket sealing said shaft in said sleeve, means to secure said gasket to said sleeve, a housing for said gasket and means including discharge openings, said housing being secured to said shaft, and a second gasket between said housing and sleeve, said openings acting to maintain said gaskets in dry condition.

CLARENCE W. SPICER.